US012603709B2

(12) United States Patent
Ghasemi et al.

(10) Patent No.: US 12,603,709 B2
(45) Date of Patent: Apr. 14, 2026

(54) METHOD AND A DEVICE FOR CARRIER RECOVERY

(71) Applicants: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES)

(72) Inventors: Saeed Ghasemi, Castelldefels (ES); Sebastián Etcheverry, Castelldefels (ES); Valerio Pruneri, Castelldefels (ES)

(73) Assignees: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 234 days.

(21) Appl. No.: 18/550,890

(22) PCT Filed: Apr. 22, 2021

(86) PCT No.: PCT/EP2021/060494
§ 371 (c)(1),
(2) Date: Sep. 15, 2023

(87) PCT Pub. No.: WO2022/199859
PCT Pub. Date: Sep. 29, 2022

(65) Prior Publication Data
US 2024/0171287 A1 May 23, 2024

(30) Foreign Application Priority Data

Mar. 22, 2021 (EP) ..................................... 21382228

(51) Int. Cl.
*H04B 10/00* (2013.01)
*H04B 10/61* (2013.01)
(Continued)

(52) U.S. Cl.
CPC ......... *H04B 10/6165* (2013.01); *H04B 10/70* (2013.01)

(58) Field of Classification Search
CPC ........ H04B 10/70; H04B 10/60; H04B 10/61; H04B 10/6164; H04B 10/6165
See application file for complete search history.

(56) References Cited

U.S. PATENT DOCUMENTS 10,805,075 B2    10/2020   Alleaume et al.
10,958,427 B2    3/2021    Su
(Continued)

FOREIGN PATENT DOCUMENTS

JP    2019513314 A    5/2019
JP    2019522394 A    8/2019

OTHER PUBLICATIONS

Japan Patent Office, Office Action Issued in Application No. 2023-558236, Nov. 12, 2024, 7 pages.
(Continued)

*Primary Examiner* — Daniel G Dobson
(74) *Attorney, Agent, or Firm* — McCoy Russell LLP

(57) ABSTRACT

The present invention relates to a method and a device for feed-forward carrier recovery in coherent optical communication. The present invention discloses the method and the device to receive an optical signal from a light source, wherein the optical signal comprises at least one pilot pulse and at least one signal pulse including information. Quadrature values of a plurality of samples of the at least one pilot pulse are determined using a local oscillator signal of a local oscillator source. A phase difference between the received
(Continued)

300

Receiving an optical signal from a light source, the optical signal comprising at least one pilot pulse (R) and at least one signal pulse (S) including information ~302

Determining quadrature values of a plurality of samples $(R_{0,i}, R_{1,i})$ of the at least one pilot pulse (R) using a local oscillator signal of a local oscillator source ~304

Determining a phase difference between the received optical signal from the light source and the local oscillator signal of the local oscillator source using the quadrature values of the plurality of samples $(R_{0,i}, R_{1,i})$ ~306

Recovering the carrier information of the at least one signal pulse (S) based on the determined phase difference ~308 optical signal of the light source and the local oscillator signal of the local oscillator source is determined using the quadrature values of the plurality of samples and the carrier information of the at least one signal pulse is recovered based on the determined phase difference.

23 Claims, 6 Drawing Sheets

(51) Int. Cl.
_H04B 10/70_ (2013.01)
_H04J 14/00_ (2006.01)

(56) References Cited

U.S. PATENT DOCUMENTS

2017/0078029 A1* 3/2017 Qi ..................... H04B 10/0795
2019/0199523 A1 6/2019 Alleaume et al.

OTHER PUBLICATIONS

Qi, B. et al., "Generating the Local Oscillator "Locally" in Continuous-Variable Quantum Key Distribution Based on Coherent Detection," Physical Review X, vol. 5, No. 041009, Oct. 21, 2015, 12 pages.
Soh, D. et al., Self-Referenced Continuous-Variable Quantum Key Distribution Protocol, Physical Review X, vol. 5, No. 041010, Oct. 21, 2015, 15 pages.

* cited by examiner

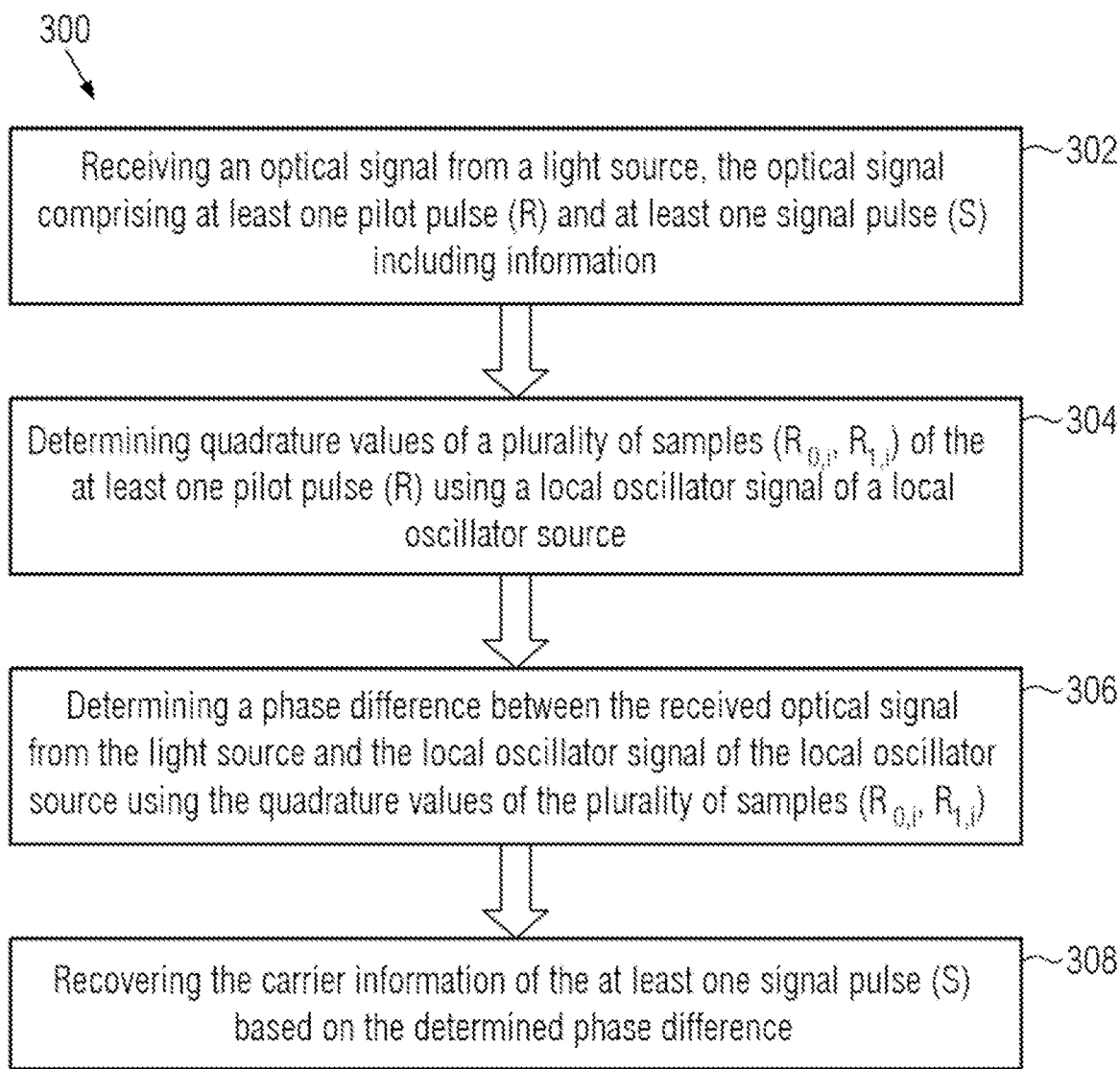

300

Receiving an optical signal from a light source, the optical signal comprising at least one pilot pulse (R) and at least one signal pulse (S) including information ~302

Determining quadrature values of a plurality of samples ($R_{0,i}$, $R_{1,i}$) of the at least one pilot pulse (R) using a local oscillator signal of a local oscillator source ~304

Determining a phase difference between the received optical signal from the light source and the local oscillator signal of the local oscillator source using the quadrature values of the plurality of samples ($R_{0,i}$, $R_{1,i}$) ~306

Recovering the carrier information of the at least one signal pulse (S) based on the determined phase difference ~308

FIG. 3

METHOD AND A DEVICE FOR CARRIER RECOVERY

CROSS REFERENCE TO RELATED APPLICATIONS

The present application is a U.S. National Phase of International Application No. PCT/EP2021/060494 entitled "A METHOD AND A DEVICE FOR CARRIER RECOVERY," and filed on Apr. 22, 2021. International Application No. PCT/EP2021/060494 claims priority to European Patent Application No. 21382228.1 filed on Mar. 22, 2021. The entire contents of each of the above-listed applications are hereby incorporated by reference for all purposes.

FIELD OF THE INVENTION

The present invention relates to a method and a device for carrier recovery, in particular, in coherent optical communication. In particular, the present invention relates to a method and a device for feedforward carrier recovery which can allow phase and/or frequency recovery, for example, in coherent optical communication and quantum cryptography.

BACKGROUND OF THE INVENTION

Quantum key distribution (QKD) allows two parties, typically referred to as Alice and Bob, to share and/or generate cryptographic keys by distributing quantum signals through a communication channel. One of the main QKD implementations is Continuous-variable QKD (CV-QKD). CV-QKD typically uses coherent states of light (for e.g., weak optical pulses) as quantum signals and the information is encoded in the conjugated quadratures of electromagnetic field. The quadratures are related to the amplitude and phase of the signal pulses.

A typical CV-QKD system can include an emitter, typically known as Alice, which sends, for example, low-intensity quantum pulses (i.e. coherent states) with encoded random information to a receiver, known as Bob, which can use coherent detection to measure the quantum pulses. In coherent detection, a high-intensity reference signal called local oscillator (LO) can be mixed or interfered with the signal pulses sent by Alice to retrieve their quadrature values. The output of the detection can be affected by any phase fluctuation in the Alice symbol signal and LO signal. More specifically, fluctuation in the phase difference between LO and Alice signals can affect the detection. For this reason, in some implementations of CV-QKD, the LO and the quantum signals can be generated from the same laser at Alice and both the signals are transmitted to Bob. Transmitting the LO over the optical channel allows for constant phase relation between the high-intensity LO and low-intensity Alice pulses. However, this may lead to unwanted access of the secret key by third parties i.e. eavesdropping.

In some other implementations of CV-QKD, the LO can be generated locally at Bob's side with an additional laser. Such use of free-running LO at Bob may require a carrier or phase recovery procedure to compensate for any phase fluctuations between the quantum signals generated by Alice and the LO. In classical coherent communication, when high-intensity signal pulses are used, phase fluctuations can be compensated by referencing to the transmitted pulses themselves. An alternative may be to use so-called pilot signals for avoiding any phase ambiguities due to data modulation.

Conventional techniques describe a method for recovering the phase information of low-intensity signal by using two or more consecutive pilot pulses (also referred to as reference pulses) to estimate the phase and frequency difference between Alice's and LO signals. However, for obtaining an accurate estimation of the phase, the frequency difference between the Alice laser and the LO may have to be within a range of $\pm\frac{1}{2}T_b$, with $T_b$ the time delay between two consecutive pilot pulses (see FIG. 1). For example, in a high-speed CV-QKD system, pilot pulses could run at a rate of 100 MHz, and, in this case, the frequency difference between the Alice laser and the LO, may have to be within 50 MHz. This has the drawback of requiring the use of very stable laser sources, with complex structures, thereby limiting availability and higher cost. For instance, atomic transitions can be used to stabilize the frequency of lasers. However, this may lead to the use of additional components such as gas cells. Even in the case that laser signals are stable, there can typically be a difference in the emitted frequency (wavelength) between the Alice laser and the LO. Therefore, an additional relative wavelength tuning may become required, which typically is achieved by changing current and/or temperature.

Moreover, the above-mentioned conventional method typically uses trigonometric functions to measure the phase of pilot and/or quantum pulses so as to recover the information. Alternative to trigonometric functions, in some implementations, look-up-table (LUT) could be used. Both trigonometric function and LUT approaches may, however, suffer from large computation time, hardware and/or resources. An LUT-free technique could be used to achieve a real-time feed-forward and feed-back carrier recovery. This technique can be based on selecting the optimum sample (for e.g., in terms of power) of each symbol to recover the data, thus limiting the frequency range of operation.

One conventional example, as illustrated in FIG. 1, shows typical experimental setup of CV-QKD with true local oscillator (LO—so-called free running). The emitter/transmitter (Alice) 101 can use a continuous-wave laser source 103, wherein the laser may be modulated by an amplitude modulator (AM) 105 and/or a phase (PM) electro-optic modulator 107 to obtain optical pulses with quadrature values following, for example, Gaussian random distribution. The in-phase and out-of-phase quadrature signals encoded by the emitter/transmitter 101 are referred to as $X_A$ and $P_A$, respectively. Subsequently, an attenuator (ATT) 109 can be used to set the signal variance (i.e. Alice modulator variance) to a value that may maximize or optimize the secret key rate. The modulation variance can usually be equal to twice the mean photon number.

The modulated optical pulses are sent to a receiver (Bob) 201, where they can be interfered, in a receiving unit 203, with an LO signal generated by the LO 205 which typically can operate in continuous-wave. A polarization controller (PC) 207, of the receiving unit 203, can be used to align the polarization of the quantum pulses and the local oscillator to maximize or optimize interference. The interference can be carried out in a 90° optical hybrid (90° OH)—a part of a detector 209, and the outputs from the optical hybrid can be measured by the detector 209. The receiver 201 can be configured to process the measurements in real-time to obtain data correlated to Alice signals, $X_A$ and $P_A$. The real-time data processing can typically be carried out by a control unit such as a digital signal processing (DSP) unit 211.

The frequency difference $\Delta f$ between the LO and the received signal from the emitter/transmitter (Alice) laser, as well as the frequency noise of the lasers $f_n$ can result in a phase drift (phase noise) in the measured quadratures. The in-phase and out-of-phase quadrature values of the quantum signals received by Bob (referred as $X_B$ and $P_B$), are related to Alice signals as:

$$X_B = X_A \cos \varphi - P_A \sin \varphi + N_X$$

$$P_B = X_A \sin \varphi + P_A \cos \varphi + N_P \quad (1)$$

Equation (1) corresponds to a rotation by a phase of $\varphi$ due to the noise $(\Delta f + f_n)$, where $N_X$ and $N_P$ are zero-centered Gaussian noises that can include shot noise and excess noise of the system.

In order to retrieve the values of $X_A$ and $P_A$ assigned by Alice, Bob may need to perform phase recovery algorithm, which can be carried out by the coordinate rotation:

$$X'_B = X_B \cos \varphi + P_B \sin \varphi$$

$$P'_B = -X_B \sin \varphi + P_B \cos \varphi \quad (2)$$

The use of pilot pulses (reference pulses) is known for phase recovery in both classical and quantum communication. In classical coherent communication, phase recovery is typically done directly from the signal by using methods such as the $M^{th}$ power scheme. Thus, in classical coherent communication, pilot pulses are not strictly needed for data recovery. In continuous-variable (CV) quantum key distribution, the use of pilot pulses R may be necessary as the signal pulse(s) S carrying data may have low intensity and such low-intensity signal pulses S may not be suitable for accurate phase noise or frequency drift estimation. In this case, the data recovery may be based exclusively on the information of the pilot pulses R.

For instance, using the scheme of FIG. 2, where pilot pulses R are interleaved between signal pulses S, the phase information of the quantum signal pulse S can be obtained by retrieving the phase information of high-intensity pilot pulses R placed before and after the quantum signal pulse S using trigonometric functions and/or linear interpolation. In FIG. 2, a time delay between the pilot pulse $R_i$ and the quantum pulse $S_i$ is $T_d$, and a time delay between the two pilot pulses $R_i$ and $R_{i+1}$, is $T_b$. The index i refers to the $i^{th}$ signal or pilot pulse. However, as mentioned above, this conventional technique has several limitations, such as the limited frequency range and hardware implementation complexity.

SUMMARY OF THE INVENTION

In view of the above, it is an object of the present invention to provide an improved method and/or device to address one or more of the above-mentioned challenges, disadvantages and/or problems. In other words, there exists a need for a method and/or a device that can accurately recover quantum signal pulse(s) in the presence of large frequency drifts (of light sources) while also reducing the hardware complexity.

The present invention, in specific embodiment(s), addresses the above-mentioned object by providing a method for feedforward carrier recovery. The method comprises a step of receiving an optical signal from a light source, wherein the optical signal comprises at least one pilot pulse and at least one signal pulse including information, a step of determining quadrature values of a plurality of samples of the at least one pilot pulse using a local oscillator signal of a local oscillator source, a step of determining a phase difference between the received optical signal of the light source and the local oscillator signal of the local oscillator source using the quadrature values of the plurality of samples, and a step of recovering carrier information of the at least one signal pulse based on the determined phase difference.

In this context, the term "pilot pulse" refers to a reference pulse, the term "quadrature values" can refer to an in-phase and/or out-of-phase quadrature values, the term "sample" refers to one point on, for example, the amplitude/intensity/power vs time graph of the pilot pulse. The term "signal pulse" can refer to signal pulse including carrier information, e.g., communication information or data encoded therein, wherein the information can be of plurality in nature. Here, "recovering the carrier information" refers to the retrieving of the signal pulse after compensating for the phase difference. The pilot pulses can be periodic or non-periodic with uneven time delay therebetween.

According to the inventive method, the optical signal, comprising the at least one pilot pulse and the at least one signal pulse, is received from the light source, and the quadrature values of the plurality of samples of the at least one pilot pulse using the local oscillator signal of the local oscillator source are determined for determining the phase difference between the received optical signal of the light source and the local oscillator signal of the local oscillator source. Since quadrature values of the plurality of samples of the at least one pilot pulse is used, the carrier information recovery can be improved by this accurate determination, in particular, in a large range of frequency drifts between the light source and the local oscillator source, for example, in comparison with conventional technique which uses one sample, usually optimal sample, of the pilot pulse. Advantageously, therefore, the inventive method can allow compensation of large frequency drifts in a real-time operation, and offer a robust yet simplified and/or efficient method for feed-forward carrier recovery. Further, as a large range of frequency drift can be compensated, expensive and/or complex laser hardware can be avoided, thereby achieving a cost-effective application.

In specific embodiment(s) of the invention, the quadrature values of at least two adjacent samples, in particular, two directly adjacent samples, of the at least one pilot pulse may be used for determining the phase difference. In a specific embodiment, two adjacent samples of the at least one pilot pulse may be used. In this context, the term "two adjacent samples" can refer to "two consecutive samples" with a predetermined sampling frequency, for example, wherein the predetermined sampling frequency may be a minimum frequency as determined by the sampling technique/hardware (for e.g., 1G sample per second (1 GSps)), or a fixed frequency, for example, set by a user. By using two adjacent samples, the determination of the quadrature values and the phase difference can be made robust and simplified, which in turn can achieve accurate recovery of the carrier information with simplified procedure, in particular in a large range of frequency drifts.

In specific embodiment(s) of the invention, the at least one of the samples of the pilot pulse may be chosen based on any one of a predetermined time delay between pilot pulse and the signal pulse, the power, the amplitude, the intensity of the pilot pulse, and the peak values thereof. Choosing the at least one of the samples of the pilot pulse can be uncomplicated and without need of special hardware, thereby aiding in simplifying the carrier recovery procedure.

In specific embodiment(s) of the invention, the step of recovering the carrier information may include a step of calculating a compensating factor to determine quadrature values of the at least one signal pulse. The calculation of the compensating factor can allow recovery of the carrier information and also the determination of quadrature values of the at least one signal pulse, in particular, accurately, using simplified hardware procedure. The determination of the compensating factor shall aide in real-time feed forward recovery. Accordingly, in one specific example, the compensating factor may be calculated for recovering the quantum signal pulse(s) which is(are) placed, in particular, after the at least one pilot pulse. The present invention, however, is not limited thereto. In an alternative embodiment, the compensating factor may be calculated for recovering the quantum signal pulse(s) which is(are) placed before the at least one pilot pulse.

In specific embodiment(s) of the invention, the compensating factor may be calculated based on any one of the phase difference, time delay between two adjacent samples of the pilot pulse, time delay between the at least one signal pulse and one of the samples of the pilot pulse, and/or any combinations thereof. As the parameters such as the phase difference or quadrature values of the pilot samples, or time delay between two adjacent samples of the pilot pulse and/or time delay between the at least one signal pulse and one of the samples of the pilot pulse are used, the calculation of the compensating factor takes into account the real-time values, and therefore the calculation procedure can be simplified because these parameter(s) can be readily extracted from the pilot and signal pulse.

In specific embodiment(s) of the invention, the compensating factor may be, for example, a coordinate rotation matrix, including one or more trigonometric coefficients. The coordinate rotation matrix can allow simplified recovery, especially in terms of hardware/software implementation, of the carrier information and determination of quadrature values of the at least one signal pulse.

In specific embodiment(s) of the invention, the compensating factor may be calculated using a block module. The block module can be a signal processing module comprising components facilitating simple mathematical operations such as multiplication, addition, or subtraction. Thus, the block module can facilitate real-time implementation using signal processing unit and can allow avoiding computer-demanding trigonometric functions/calculations or LUT.

In specific embodiment(s) of the invention, the optical signal may include a train of signal pulses. By having a train of signal pulses corresponding to at least one pilot pulse, the number of pilot or reference pulses can be reduced, which in turn can reduce the overhead and increase the security key rate as the pilot pulses may not have encoded data information that can be used to extract a key. Here, the term "corresponding to" can indicate that at least one pilot pulse is used as the reference pulse, for the given train of signal pulses, in determining the phase difference. Here, at least one signal pulse of the train of signal pulses can include the carrier information.

In specific embodiment(s) of the invention, one or more of the samples of the pilot pulse may be sampled at a sampling frequency that is at least twice the inverse of the pulse width of the pilot pulse. In a specific embodiment, each pilot pulse can be sampled at least twice. This also applies regardless of the pulse shapes, inter-pulse spacing of the pulses' train. This sampling frequency can ensure optimal sampling, of the pilot pulse that can provide at least two samples, which may be necessary for accurate estimation of the phase difference using plurality of samples.

In specific embodiment(s) of the invention, the at least one pilot pulse may be an optical pulse with intensity higher than that of the at least one signal pulse. Accordingly, any phase fluctuations can be compensated by referencing to the high-intensity pilot pulse, thereby loss of encoded information in the signal pulse(s) can be avoided. Further, by having higher-intensity pilot pulse, noise due to the pilot pulse can be minimized, thereby aiding the accurate recovery of the carrier information of the signal pulse.

In specific embodiment(s) of the invention, the at least one pilot pulse may be interleaved with the at least one signal pulse. That is, at least one pilot pulse may be interleaved with the one or a plurality of signal pulses. This may be advantageous especially in reducing the hardware requirements. In one specific example, the interleaving may be performed using time division multiplexing. In another specific example, interleaving may be performed by transmitting a multiplexed data composed of, for example, the signal pulse and the pilot pulse from the signal source.

In specific embodiment(s) of the invention, the at least one signal pulse may be transmitted according to a quantum cryptography protocol, in particular, a continuous-variable quantum key distribution (CV-QKD) protocol. In the CV-QKD, usually low-intensity signal pulse is detected. Advantageously, therefore, this embodiment can allow for coherent detection of low-intensity signal pulse without the disadvantage of requiring stable laser source(s) for detecting such low-intensity signal pulse.

The present invention, in specific embodiment(s), addresses the above-mentioned object by providing a device configured for feedforward carrier recovery. The device comprises a receiving unit configured to receive an optical signal from a light source, wherein the optical signal comprises at least one pilot pulse and at least one signal pulse including information. The device further comprises a control unit configured to determine quadrature values of a plurality of samples of the at least one pilot pulse using a local oscillator signal of a local oscillator source. The control unit is further configured to determine a phase difference between the received optical signal of the light source and the local oscillator signal of the local oscillator source using the quadrature values of the plurality of samples, and recover the carrier information of the at least one signal pulse based on the determined phase difference.

In the inventive device, the control unit determines quadrature values of the plurality of samples of the at least one pilot pulse using the local oscillator signal of the local oscillator source. Since quadrature values of the plurality of samples of the at least one pilot pulse is used, the carrier information recovery can be improved by this accurate determination, in particular, in a large range of frequency drifts between the light source and the local oscillator source, for example, in comparison with conventional technique which use one sample of the pilot pulse. Advantageously, therefore, the inventive device can allow compensation of large frequency drifts in a real-time operation, and offer a robust yet simplified and/or efficient device for feed-forward carrier recovery. Further, as a large range of frequency drift can be compensated, expensive and/or complex laser hardware can be avoided, thereby achieving a cost-effective device.

In specific embodiment(s) of the invention, the control unit may be configured to determine the phase difference using quadrature values of two adjacent samples of the at least one pilot pulse. In a specific embodiment, two adjacent samples of the at least one pilot pulse may be used. By using two adjacent samples, the determination of the quadrature values and the phase difference can be simplified and at the same time the accuracy thereof, in particular in a large range of frequency drifts between the light source and the local oscillator source, can be improved, which in turn can achieve accurate recovery of the carrier information with simplified device.

In specific embodiment(s) of the invention, the control unit may be configured to calculate a compensating factor to determine quadrature values of the at least one signal pulse. The calculation of the compensating factor can allow recovery of the carrier information and also the determination of quadrature values of the at least one signal pulse, in particular, accurately, using simplified hardware. In one specific example, the compensating factor may be calculated for recovering the quantum signal pulse(s) which is(are) placed, in particular, after the at least one pilot pulse.

In specific embodiment(s) of the invention, the control unit may comprise a clock recovery circuit configured to receive the signal pulse received and/or detected by the receiving unit, and/or the at least one pilot pulse (R) for recovering carrier information. The clock recovery circuit can act as a part of digital signal processing aiding in carrier recovery. The clock recovery circuit of the control unit may be configured to determine quadrature values of the plurality of samples of the at least one pilot pulse.

In specific embodiment(s) of the invention, the clock recovery circuit may be configured to choose at least one of the samples of the pilot pulse based on any one of a predetermined time delay between pilot pulse and the signal pulse, the power, the amplitude, the intensity of the pilot pulse, and the peak values thereof. Choosing the at least one of the samples of the pilot pulse, using the clock recovery circuit, can be uncomplicated and without need of special hardware, thereby aiding in simplifying the carrier recovery. In one specific example, the clock recovery circuit may be configured to identify the best sample in terms of optical power on the pilot pulse, its adjacent sample and/or the signal pulse/symbol using an input process clock with frequency of $1/T_s$.

In specific embodiment(s) of the invention, the control unit may be configured to calculate the compensating factor based on any one of the phase difference, time delay between two adjacent samples of the pilot pulse, time delay between the at least one signal pulse and one of the samples of the pilot pulse, and/or any combinations thereof. As the parameters such as the phase difference or quadrature values of the pilot samples, or time delay between two adjacent samples of the pilot pulse and/or time delay between the at least one signal pulse and one of the samples of the pilot pulse are used, the calculation of the compensating factor can be simplified because these parameter(s) can be readily extracted by the control unit from the pilot and signal pulse.

In specific embodiment(s) of the invention, the compensating factor may be, for example, a coordinate rotation matrix, including one or more trigonometric coefficients. The coordinate rotation matrix can allow simplified recovery, especially in terms of hardware/software implementation, of the carrier information and determination of quadrature values of the at least one signal pulse.

In specific embodiment(s) of the invention, the control unit may comprise a block module configured to calculate the compensating factor. The block module can be a signal processing module comprising simple mathematical operations such as multiplication, addition, or subtraction. Thus, the block module can facilitate real time implementation using digital signal processing and can allow avoiding computer-demanding trigonometric functions or LUT.

In specific embodiment(s) of the invention, the block module may comprise at least one adder and at least one multiplier for calculating the compensating factor. By configuring the block module using one or more adders and/or one or more multipliers, the calculation of the compensating factor, which may involve trigonometric coefficients, can be simplified using simple additions and/or multiplications, wherein the subtraction and division can also be performed using the adder and multiplier, respectively. Accordingly, a simple but robust feed-forward carrier recovery can be made possible with simplified architecture.

In specific embodiment(s) of the invention, the block module may comprise at least one multiplexer configured to select one or more input for the block module, and at least one register buffer configured to process one or more input for the block module. The one or more multiplexers and the one or more register buffers can facilitate processing of the one or more input for the block module so that the compensating factor can be accurately determined with simplified hardware.

In specific embodiment(s) of the invention, the control unit may be implemented in a digital signal processing (DSP) hardware, in particular, a field-programmable gate array (FPGA). Thus, the inventive device can be applied by offline processor or real-time DSP such as FPGA, with low-cost lasers for cost effective systems in both classical communications and quantum cryptography applications.

BRIEF DESCRIPTION OF THE DRAWINGS

FIG. 3 illustrates a schematic flow diagram of a method for feedforward carrier recovery in accordance with specific embodiment(s) of the present invention.

DETAILED DESCRIPTION

In the following, features and advantageous embodiments of the present invention will be described in detail with reference to the Figures.

FIG. 3 shows a schematic flow diagram of a method 300 for feedforward carrier recovery in accordance with specific embodiment(s) of the present invention. The method includes a step 302 of receiving an optical signal from a light source, wherein the optical signal comprises at least one pilot pulse R and at least one signal pulse S including information. The method further comprises a step 304 of determining quadrature values of a plurality of samples $R_0$, $R_1$ of the at least one pilot pulse R using a local oscillator source, in particular a local oscillator signal of the local oscillator source. The method further comprises a step 306 of determining a phase difference between the light source, in particular the received optical signal, and the local oscillator source, in particular the local oscillator signal, using the quadrature values of the plurality of samples $R_0$, $R_1$. The method further comprises a step 308 of recovering the carrier information of the at least one signal pulse S based on the determined phase difference.

The step 302 in FIG. 3 can include receiving the optical signal via an optical path. The optical path can be one or more fiber-optic channels. The optical signal can be received from the transmitter or a transmitter light source (such as a continuous laser source) of FIG. 1. The optical signal includes the at least one pilot pulse (i.e. reference pulse) R and the at least one signal pulse S. In an embodiment, the signal pulse can be a pulse including carrier information, e.g., communication information, or data encoded therein. In an example, the signal pulse S can be phase and/or amplitude modulated. The pilot pulse is the reference pulse and can be from the same source as that of the signal pulse, or from a different source. The pilot pulse R may not include information encoded therein. In an example, the pilot pulse R can be phase and/or amplitude modulated.

In one embodiment, the at least one pilot pulse R may be of higher intensity (e.g., amplitude) than that of the at least one signal pulse S. In an embodiment, a ratio between the intensity of the pilot pulse R and the intensity of the signal pulse S can be in the range of 100 to 500. In a specific embodiment, the ratio can be at least 100. In a specific embodiment, the pilot pulse R can be a high-intensity pilot pulse and the signal pulse S can be a low-intensity quantum pulse with a predetermined intensity ratio therebetween in accordance with a quantum cryptography protocol such as a continuous-variable quantum key distribution (CV-QKD) protocol.

Figure 4:
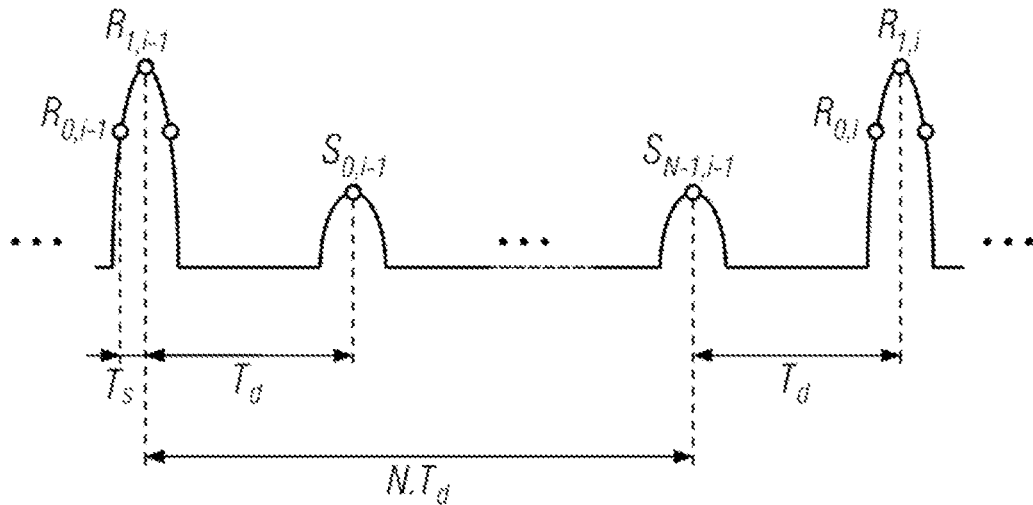
FIG. 4 illustrates sampling of the at least one pilot pulse to determine the quadrature values of at least two adjacent/consecutive samples in accordance with specific embodiment(s) of the present invention.

FIG. 4 (which will be described in detail later) illustrates that, in an embodiment, the optical signal can include a train or sequence of signal pulses $S_0$ to $S_{N-1}$ following at least one pilot pulse R, where N refers to the signal pulse number in the train/sequence. That is, the at least one pilot pulse R can be interleaved with the one or a plurality of signal pulses $S_0$ to $S_{N-1}$. In one specific embodiment, the interleaving can be performed using time division multiplexing. In another specific embodiment, interleaving can be performed by transmitting a multiplexed data composed of one or more quantum signal pulse(s) $S_0$ to $S_{N-1}$ and at least one pilot pulse(s) R from the light source.

The step 304 in FIG. 3 includes determining quadrature values of the at least one pilot pulse R using the local oscillator source. In particular, the quadrature values of the plurality of samples $R_0$, $R_1$ of the at least one pilot pulse R are determined using the local oscillator source, in particular the local oscillator signal of the local oscillator source. In an embodiment, the quadrature values refer to in-phase and out-of-phase quadrature values. Referring to FIG. 4, in an embodiment of the invention, at least two samples $R_0$, $R_1$ of the at least one pilot pulse R are sampled for the quadrature values determination. The sampling however is not limited to two. Depending on the circumstances and/or hardware/ software limitation, more than two, three, four samples or so on can also be used. In a specific example, only two adjacent samples are used.

In a specific embodiment, the two samples are adjacent or consecutive to each other with a predetermined sampling frequency/rate. The predetermined sampling frequency may be a minimum frequency as determined by the sampling technique/hardware, or a frequency set by a user. In an embodiment, FIG. 4 shows an $i^{th}$ pilot pulse R having two adjacent samples $R_{0,\,i}$ and $R_{1,i}$ (or $R_{0,\,i-1}$ and $R_{1,\,i-1}$ for the i–1$^{th}$ pilot pulse). In an embodiment, the adjacent samples $R_{0,\,i}$ and $R_{1,\,i}$ are followed by N–1 signal pulses $S_0$ to $S_{N-1}$. The sampling frequency of the adjacent samples $R_0$ and $R_1$ is referred to as $1/T_s$.

In a preferred embodiment, one or more of the samples $R_0$, $R_1$ of the pilot pulse R are sampled at the sampling frequency $1/T_s$ that can be at least twice the inverse the pulse width (measured in time units) of the pilot pulse R so as to meet the Nyquist theorem. In a specific embodiment, each pilot pulse is sampled at least twice. This also applies to other pulse shapes, inter-pulse spacing of the pulses' train. At least one out of the plurality of samples $R_0$, $R_1$ of the pilot pulse R can be chosen based on any one of the predetermined time delay $T_d$ between the pilot pulse R and the signal pulse S, the power, the amplitude, the intensity of the pilot pulse R, and the peak values thereof. In FIG. 4, the sample $R_1$ is chosen to be the optimal sample based on the peak power/amplitude/intensity of the pilot pulse R. The sample $R_0$ can be chosen based on a predetermined sampling point, and/or a predetermined time delay with $R_1$ (best sample) of the pilot pulse R.

Here, the term "local oscillator source" can refer to a free running laser source at Bob's (receiver) end, and the term "local oscillator" can refer to an output, i.e., the local oscillator signal, of the laser oscillator source. The pilot pulse R and the signal pulse S can be made to interfere with the local oscillator signal to determine the quadrature values.

In step 306, the phase difference between the received optical signal of the light source and the local oscillator signal of the local oscillator source is determined using the quadrature values of the plurality of samples $R_0$, $R_1$ of the at least one pilot pulse R. In an embodiment, this step of determining the phase difference may provide a function or component of the determined phase difference which can be used to compensate for phase error by recovering the carrier information and determining quadrature values of the at least one signal pulse.

In step 308 of FIG. 3, the carrier information of the at least one signal pulse S is recovered based on the determined phase difference. This step allows compensation for phase errors/mismatch using the phase difference/information extracted from the at least one pilot pulse in the step 306. In one specific example, the step 308 can allow feed-forward carrier recovery of low-intensity signal pulse(s) based on sampling of high-intensity pilot pulses.

A specific non-limiting embodiment of the invention will be described with reference to FIGS. 4 and 5. In this specific embodiment, the quadrature values of at least two adjacent/consecutive samples $R_0$ and $R_1$ of the at least one pilot pulse R are used for determining the phase difference.

In FIG. 4, the $i^{th}$ pattern corresponds to one pilot pulse R composed of two consecutive samples $R_{0,i}$ and $R_{1,i}$ followed by N–1 signal pulses S. Each of the signal pulse (labeled with k) with optimal sample $S_k$, in terms of power. The optimal sample $R_1$, for example, in terms of power, has time delays $T_d$ and $NT_d$ with respect to the first $S_0$ and last $S_{N-1}$ samples of signal pulses respectively. In this embodiment, the signal pulses are received periodically with equal time delay $T_d$. The invention, however, is not limited to periodic and/or equal time delay $T_d$. The in-phase $X_R$ and out-of-phase quadrature $P_R$ of the $i^{th}$ pilot pulse R measured by Bob (receiver) can be given by:

$$X_{R,i}=A\cdot\cos(\varphi_{c,i}-\varphi_{LO,i}+\varphi_{pn,i})$$

$$P_{R,i}=A\cdot\sin(\varphi_{c,i}-\varphi_{LO,i}+\varphi_{pn,i}) \tag{3}$$

where A is a coefficient related to amplitude of the pilot pulse, which for simplicity is considered as 1. The present invention, however, is not limited to A=1. $\varphi_{pn}$ is a phase noise, $\varphi_c$ is phase of transmitted signal from the light source (Alice—transmitter) on the pilot pulses R. The phase $\varphi_c$ includes the encoded phase by Alice and the phase associated with Alice laser frequency. $\varphi_{LO}$ is phase of signal of the light source from the local oscillator associated with the LO frequency. Thus, the pilot pulse R may have a phase difference of $\varphi_R=\varphi_c-\varphi_{LO}+\varphi_{pn}$. The phase $\varphi_c$ may have a component related to the Alice laser frequency for the pilot pulse(s) with no encoded information (i.e not modulated) by Alice (i.e. transmitter). However, the present is not limited to this specifics.

According to another embodiment of the invention, the at least one of the samples $R_0$ and $R_1$ of the pilot pulse R can be chosen based on any one of the time delay $T_d$, the power, the amplitude, the intensity of the pilot pulse R, and the peak values thereof. In one specific example, the best sample(s) are identified in terms of optical power on the pilot pulse R using an input process clock with frequency of $1/T_s$. Similarly, the optimal/best sample(s) of the signal pulses S can also be chosen based on the time delay $T_d$ between pilot pulse R and signal pulses S, and/or any one of the power, the amplitude, the intensity of the signal pulse, and the peak values thereof. In another specific example, the best sample $(R_{1,\ i})$ can be identified/chosen by a clock recovery circuit (described later) in terms of optical power, its adjacent sample $R_{0,i}$ (a predetermined sampling point, and/or a predetermined time delay with $R_{1,i}$), and of the signal pulse $S_{k,i}$, using an input process clock with frequency of $1/T_s$.

Furthermore, one or more of the samples of the pilot pulse R can be sampled at a frequency that is at least twice the inverse of pulse width of the pilot pulse R. This sampling frequency can ensure to meet the Nyquist theorem, and thereby optimal sampling.

In the embodiment of FIG. 4, the optical signal includes the train of signal pulses $S_{k,i}$ (with k being 1 to N−1) between two reference pulses R. Thus, for the train of signal pulses corresponding to at least one pilot pulse R, the number of pilot or reference pulses can be reduced, which in turn can reduce the overhead and increase the security key rate as the pilot pulses may not have encoded data information that can be used to extract a key.

Figure 5:
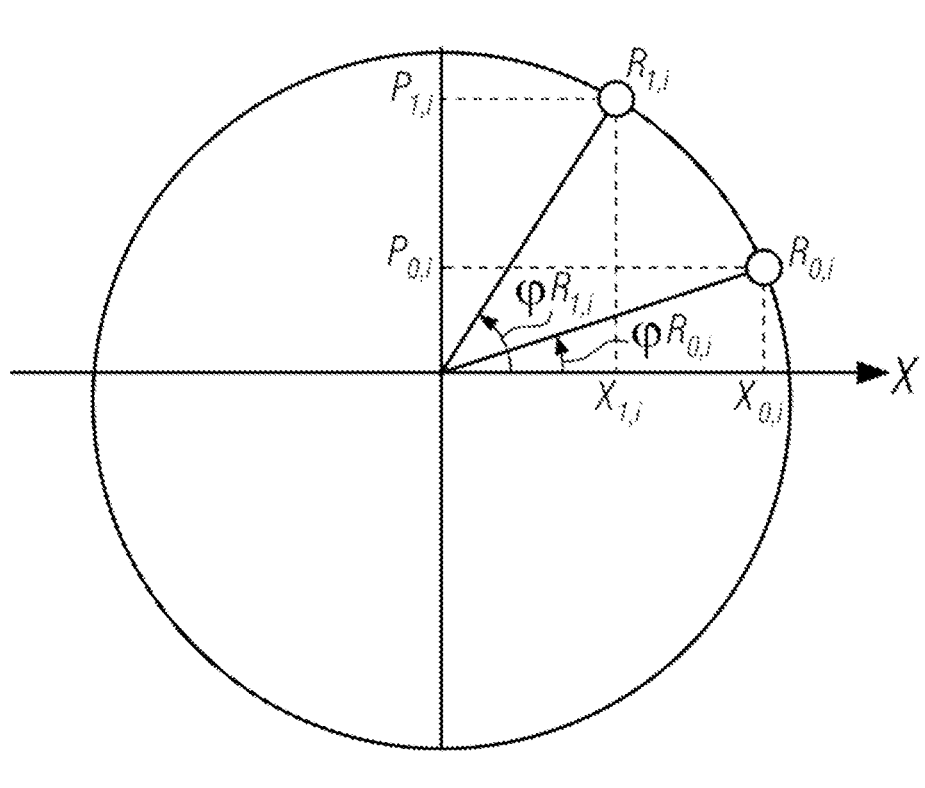
FIG. 5 illustrates the phase in the complex plane of two consecutive/adjacent samples of the $i^{th}$ pilot pulse in accordance with specific embodiment(s) of the present invention.

FIG. 5 illustrates the phase of two consecutive/adjacent samples $R_{0,i}$ and $R_{1,i}$ with phases $\varphi_{R_{0,i}}$ and $\varphi_{R_{1,i}}$, respectively, of the $i^{th}$ pilot pulse in the complex plane according to an embodiment of the invention. Accordingly, the phase of $k^{th}$ signal pulse (k: 0→N−1) in $i^{th}$ pattern can be given by:

$$\varphi_{S_{k,i}} = \varphi_{R_{1,i}} + (k+1)\cdot\frac{T_d}{T_s}\cdot\left(\varphi_{R_{1,i}} - \varphi_{R_{0,i}}\right) \tag{4}$$

The quantity $\Delta\varphi_{R_i}=\varphi_{R_{1,i}}-\varphi_{R_{0,i}}$ can represents a phase error associated to $\Delta f$ and $f_n$. In this embodiment, the frequency difference $\Delta f$ between the local oscillator source and the transmitter (Alice) laser can be higher than the frequency noise of the lasers $f_n$, and/or that the frequency difference $\Delta f$ may be constant during the time between two consecutive pilot pulses $((N+1)\cdot T_d)$, Thus, the phase of each individual sample in the pattern can correspond to an accumulation of the $\Delta\varphi_{R_i}$ associated to previous samples, assuming for example the reference phase $\varphi_{R_{1,i}}$ as the starting point. The present invention, however, is not limited to this relation as long as the frequency difference ensures accurate estimation of the phase of the signal pulses after each pilot pulse.

In this embodiment, the pilot pulse can have a constant-envelope and/or a constant radius in the complex plane (FIG. 5), leading to the following trigonometrical relations (with reference to FIG. 6):

$$\sin(\varphi_{R_{0,i}})=P_{R_{0,i}}$$

$$\sin(\varphi_{R_{1,i}})=P_{R_{1,i}}$$

$$\cos(\varphi_{R_{0,i}})=X_{R_{0,i}}$$

$$\cos(\varphi_{R_{1,i}})=X_{R_{1,i}} \tag{5}$$

Using the trigonometric identities:

$$\sin(\varphi_{R_{1,i}}-\varphi_{R_{0,i}})=\sin(\varphi_{R_{1,i}})\cdot\cos(\varphi_{R_{0,i}})-\sin(\varphi_{R_{0,i}})\cdot\cos(\varphi_{R_{1,i}})$$

$$\cos(\varphi_{R_{1,i}}-\varphi_{R_{0,i}})=\cos(\varphi_{R_{1,i}})\cdot\cos(\varphi_{R_{0,i}})+\sin(\varphi_{R_{1,i}})\cdot\sin(\varphi_{R_{0,i}}) \tag{6}$$

the following Eq. (7) can be obtained from Eq. (5)

$$\sin(\Delta\varphi_{R_i})=P_{R_{1,i}}\cdot X_{R_{0,i}}-P_{R_{0,i}}\cdot X_{R_{0,i}}$$

$$\cos(\Delta\varphi_{R_i})=X_{R_{1,i}}\cdot X_{R_{0,i}}+P_{R_{1,i}}\cdot P_{R_{0,i}} \tag{7}$$

With the above Eq. (7), therefore, the step 306 (FIG. 3) of determining the phase difference between the received optical signal of the light source and the local oscillator signal of the local oscillator source using the quadrature values of the plurality of samples $R_0$, $R_1$ can be performed in terms of function(s) or components of the phase difference (here sin and cos functions/components). As apparent from the Eq. (7), the function or component of the phase difference can be determined by simple mathematical operations on the quadrature values of the plurality of samples of the pilot pulse R. Furthermore, the function(s) or components of the phase difference can be used to compensate for phase error by recovering the carrier information and determining quadrature values of the at least one signal pulse S.

In particular, the quadratures of the pilot pulse are used to determine the phase difference between measurements at the receiver from the transmitter laser source and the local oscillator source. The phase difference can then be used to compensate or align the local oscillator source's measurement of the quadratures of the signal pulse with reference to transmitter laser source, thereby allowing the information on the signal pulse to be recovered.

In this respect, according to an embodiment of the invention, the step 308 of recovering the carrier information can include a step of calculating a compensating factor W to determine quadrature values of the at least one signal pulse S. In one specific embodiment, the compensating factor W can be calculated for the quantum signal pulse(s) S which, for example, is(are) placed after the pilot pulse R.

The step of recovering the carrier information according to an embodiment of the invention is described in the following. In this embodiment, the $k^{th}$ signal pulse, in particular, the signal pulse including information, can be recovered with quadrature values $S_i'$ which comprises in-phase quadrature of $X'_{S_{k,i}}$ and out-of-phase quadrature of $P'_{S_{k,i}}$ in $i^{th}$ pattern based on Eq. (1) and Eq. (4). Therefore, the relationship between the quadrature values $S_i'$ of the recovered signal pulse and the quadrature values $S_i$ of the received signal pulse can be given as:

$$S_i' = W_i \cdot S_i \qquad (8)$$

where $$S_i' = \begin{bmatrix} X'_{S_{k,i}} \\ P'_{S_{k,i}} \end{bmatrix} \quad S_i = \begin{bmatrix} X_{S_{k,i}} \\ P_{S_{k,i}} \end{bmatrix} \qquad (9)$$

$$W_i = \begin{bmatrix} \cos\left(\varphi_{R_{1,i}} + (k+1)\cdot\frac{T_d}{T_s}\cdot\Delta\varphi_{R_i}\right) & \sin\left(\varphi_{R_{1,i}} + (k+1)\cdot\frac{T_d}{T_s}\cdot\Delta\varphi_{R_i}\right) \\ -\sin\left(\varphi_{R_{1,i}} + (k+1)\cdot\frac{T_d}{T_s}\cdot\Delta\varphi_{R_i}\right) & \cos\left(\varphi_{R_{1,i}} + (k+1)\cdot\frac{T_d}{T_s}\cdot\Delta\varphi_{R_i}\right) \end{bmatrix}$$

The rotation matrix $W_i$ is referred to as the compensating factor W to recover transmitted information i.e. the information encoded in the signal pulse S. From the above relation Eq. (9) and with reference to FIG. 4, it can be seen that, according to an embodiment of the invention, the compensating factor W can be based on the time delay $T_s$ between two adjacent samples $R_0$, $R_1$ of the pilot pulse R and/or the time delay $T_d$ between the at least one signal pulse S and one of the samples $R_0$, $R_1$, in particular, the optimal sample $R_1$, of the pilot pulse R. In other words, the compensating factor W can be based on additional factors other than quadrature values of the pilot samples. The compensating factor W can be referred as a coordinate rotation matrix, or a coefficient thereof.

In an embodiment, to simplify the matrix W, $$\frac{T_d}{T_s} = M$$

and (k+1). M=β are assumed.

Figure 6:
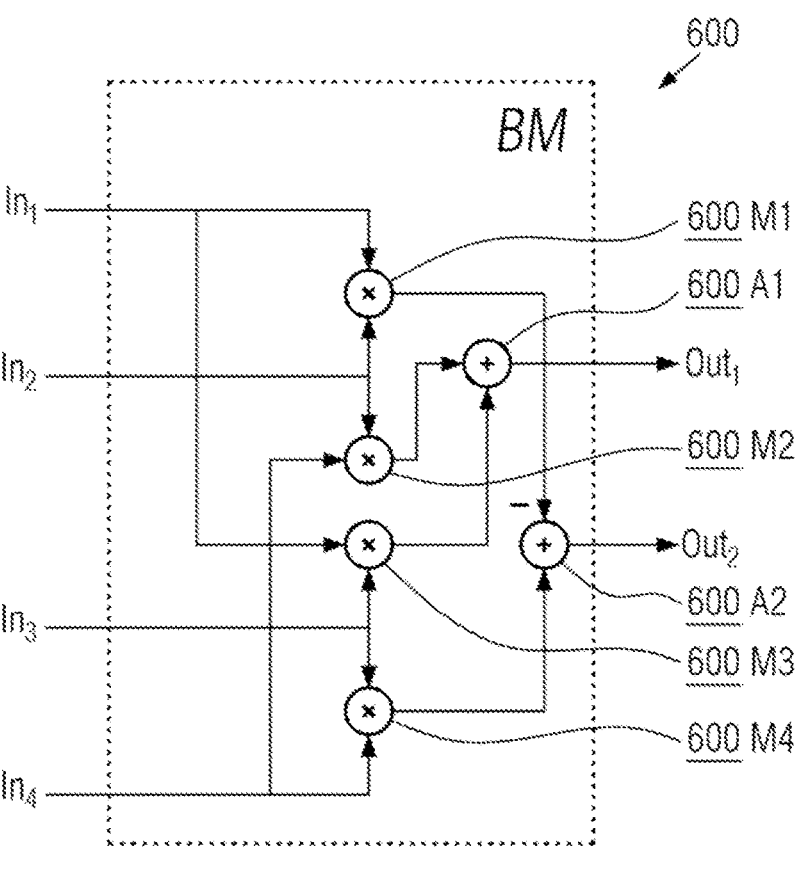
FIG. 6 illustrates a block module in accordance with specific embodiment(s) of the present invention.

To obtain trigonometrical values for the elements of matrix $W_i$ in Eq. (9), FIG. 6 represents a Block Module (BM) 600 according to an embodiment of the invention. According to the present invention, the block module 600 can be implemented to be part of a digital signal processing unit. The block module 600 includes one or more inputs $In_1$ to $In_4$, and one or more outputs $Out_1$, $Out_2$, wherein each input can relate to a trigonometric coefficient, in particular, the coefficients of the compensating factor and/or of quadrature values of the signal pulse.

In this embodiment, the block module 600 can further comprise at least one adder 600A1, 600A2, and at least one multiplier 600M1, 600M2, 600M3, 600M4. The block module 600 is not limited to these components and/or functionality. For example, the block module can be configured to perform the subtraction and/or division using the adder and/or multiplier, respectively. Further, the number of block module 600 is not limited to one. In a specific embodiment, a plurality of block modules can also be provided.

In the present embodiment, input $In_1$ is associated to sin(a), input $In_2$ is associated to sin(b), input $In_3$ is associated to cos(b), and input $In_4$ is associated to cos(a), such that the block module 600 can yield the outputs of $Out_1$=sin(a+b) and $Out_2$=cos(a+b) using the at least one adder 600A1, 600A2, and the at least one multiplier 600M1, 600M2, 600M3, 600M4. Hence, by considering:

$$\sin((\beta+1)\cdot\Delta\varphi_{R_i}) = \sin(\Delta\varphi_{R_i} + \beta\cdot\Delta\varphi_{R_i})$$

$$\cos((\beta+1)\cdot\Delta\varphi_{R_i}) = \cos(\Delta\varphi_{R_i} + \beta\cdot\Delta\varphi_{R_i}) \qquad (10)$$

and using the functionality, in particular, simple multiplication and addition, of the block module 600, and also from definitions in the Eq. (5) and Eq. (7), the matrix elements of $W_i$, that is the compensating factor W, can be obtained. By using the block module 600, thus, using of any look up table (LUT), or any specific trigonometric function calculator can be avoided in the determination of the compensating factor.

Thus, using Eq. (5) and Eq. (7), and the output of the block module 600 from FIG. 6, elements of the rotation matrix W of Eq. (9) can be obtained to thereby solve the Eq. (8) with in-phase and quadrature of S as input. Based on said input and the matrix coefficients from the block module 600, quadrature values of the signal pulse S and the matrix elements of the S' can be recovered corresponding to the given phase fluctuation.

Figure 7:
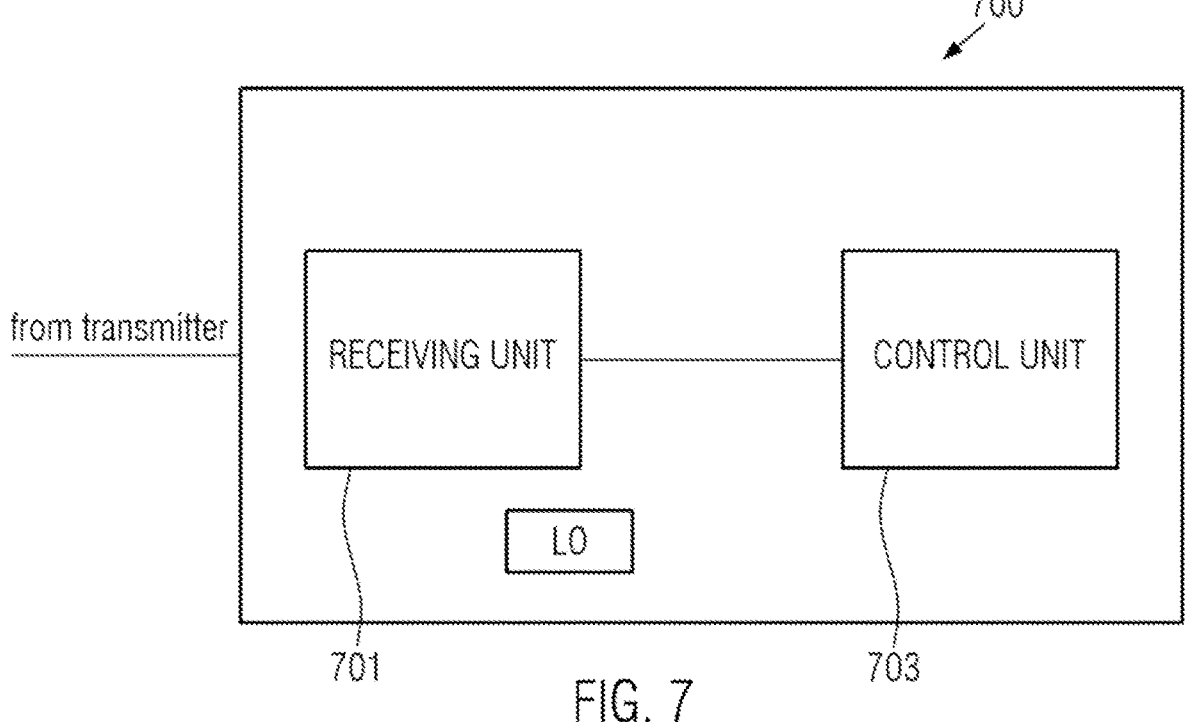
FIG. 7 illustrates a device for feedforward carrier recovery in the accordance with specific embodiment(s).

In the following, a device 700 for feedforward carrier recovery in the accordance with the invention is described with reference to the method 300 of the invention. The device 700 is configured to execute the steps of the method 300 for feedforward carrier recovery according to the invention as described above with reference to FIGS. 3 to 6. Features already discussed in relation to the method 300 is not repeated but incorporated herewith by its reference. FIG. 7 illustrates the device 700 for feedforward carrier recovery in accordance with specific embodiment(s) of the present invention.

The device 700 comprises a receiving unit 701 configured to receive the optical signal from the light source, wherein the optical signal comprises the at least one pilot pulse R and the at least one signal pulse S. The receiving unit 701 includes a local oscillator source LO. In a specific embodiment, the receiving unit 700 can be a receiver also known as Bob. For example, the receiving unit 700 can include some or all of the components of the receiver 201 of FIG. 1. The device can also include a transmitting unit (not shown) having some or all of the components of the transmitter 101 of FIG. 1.

In a specific embodiment, the receiving unit 701 can be configured to perform reception and detection of the optical signal(s) transmitted from the light source. The receiving unit 701 can include one or more opto-electronic components. The one or more opto-electronic components of the receiving unit 701 can include, but not limited to, a 90° optical hybrid, any combination of an interferometer such as a balanced/unbalanced Michelson interferometer or a balanced/unbalanced Mach-Zehnder interferometer, one or more beam splitters, a polarization member such as a polarization-maintaining optical fiber (PMF), a polarization controller for aligning the polarization of the signal pulse(s) and the local oscillator to maximize or optimize interference, one or more modulators/demodulators, and the likes.

The receiving unit 701 can also include, but not limited to, one or more opto-electronic components such as one or more single-photon detectors, a heterodyne detector, a homodyne detector and the likes. The receiving unit 701 could use homodyne or heterodyne detection. In homodyne detection, the receiving unit can choose randomly to measure either X or P quadrature by adding a 90° phase shift to the local oscillator, whereas in heterodyne detection, the receiving unit can measure both quadratures simultaneously by splitting the signal in two parts using for instance a 90° optical hybrid.

Figures 1, 2:
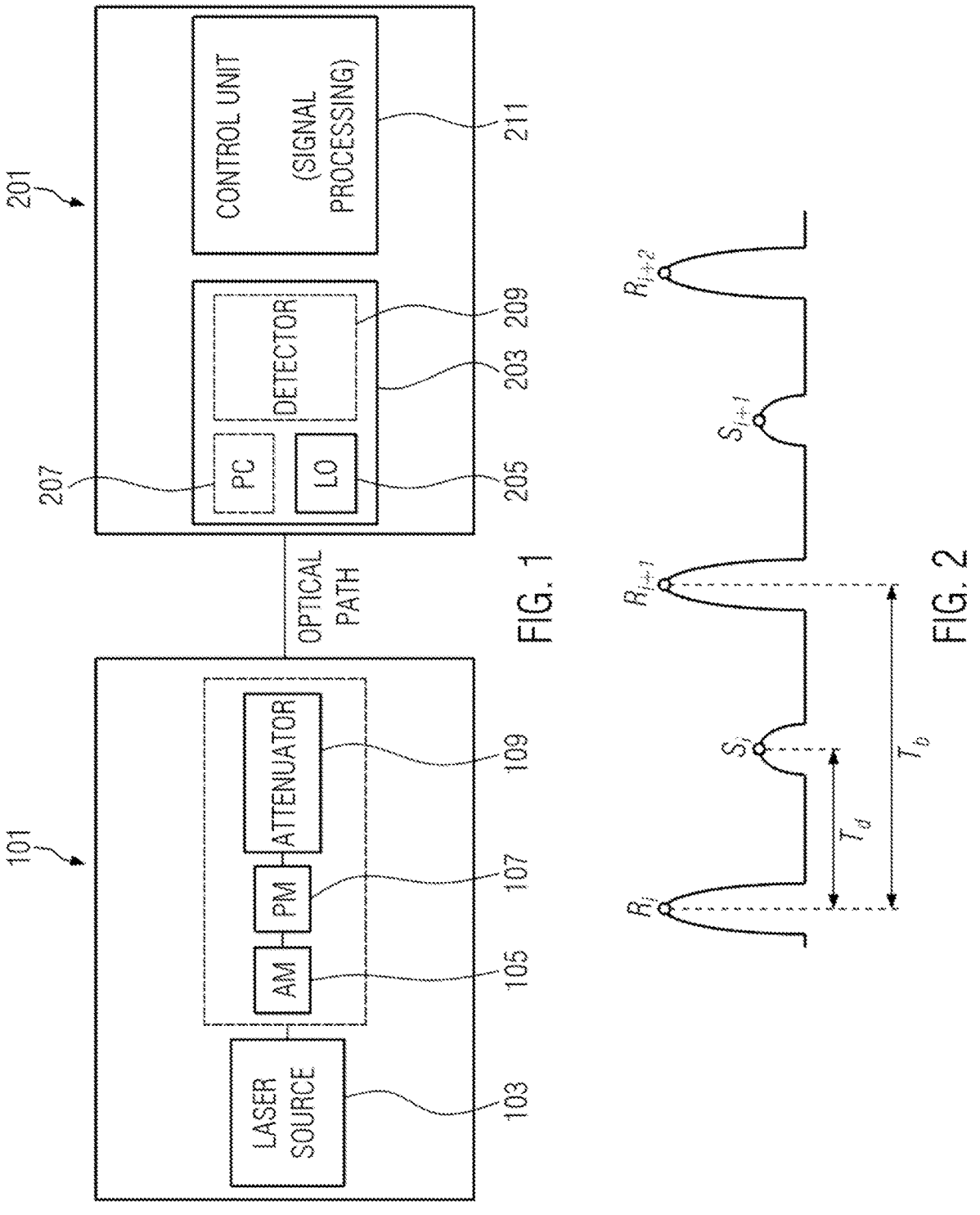
FIG. 1 illustrates a conventional experimental setup of CV-QKD with true LO.
FIG. 2 illustrates a conventional use of pilot pulses (reference pulses) for phase recovery.

The light source can be part of the transmitter 101 as defined with reference to FIG. 1. The light source can be part of the device 700 or separate from and external to the device 700 or the transmitter 101. The device 700 or the transmitter 101 could include an amplitude modulator and/or a phase modulator to obtain optical pulses with quadrature values following Gaussian random distribution. The transmitter can also include an attenuator for setting a signal variance (i.e. Alice modulator variance) to a value that may maximize or optimize the secret key rate. The modulation variance can usually be equal to twice the mean photon number. The receiving unit 701 is configured to receive the optical signal from the light source.

In an embodiment of the present invention, in place of or in addition to the transmitter 101, any conventionally known transmitter(s) can be used in combination with the device 700, in particular, the receiving unit 701 illustrated in FIG. 7 to communicate in an optical fiber network, for example, CV-QKD network. The present invention is not limited thereto. The optical fiber network can have any number of transmitting and receiving devices. The inventive device can also be a part of a transceiver. Furthermore, all or some of the receiving devices in the network can be configured according to the present invention.

The device 700 further comprises a control unit 703 configured to determine quadrature values of the plurality of samples $R_0$, $R_1$ of the at least one pilot pulse R using the local oscillator source LO (for example, a continuous wave laser similar to element 203 of FIG. 1). In this respect, a sampling unit (not shown) can be used to sample the at least one pilot pulse R. Alternatively, the control unit 703 can be configured to sample the at least one pilot pulse R. For example, the control unit 703 could include an analog to digital converter to sample the at least one pilot pulse R at the predetermined sampling frequency $1/T_s$ that can be at least twice the inverse of the pulse width of the pilot pulse R so as to meet the Nyquist theorem. The control unit 703 can be configured to choose at least one of the samples of the pilot pulse R based on any one of the time delay $T_d$, the power, the amplitude, the intensity of the pilot pulse (R), and the peak values thereof.

The control unit 703 is further configured to determine the phase difference between the received optical signal of the light source and the local oscillator signal of the local oscillator source LO using the quadrature values of the plurality of samples $R_0$, $R_1$, and recover the carrier information of the at least one signal pulse S based on the determined phase difference. For example, with reference to FIGS. 4 and 5, the control unit 703 is configured to determine the phase difference using quadrature values of the two adjacent samples $R_0$, $R_1$ of the at least one pilot pulse R. The control unit 703 is also configured to calculate the compensating factor W to determine quadrature values of the at least one signal pulse S. In a specific embodiment, the control unit 703 include the block module 600 for calculating the compensating factor W, in particular having one or more trigonometric coefficients of the rotation matrix, as described above with reference to FIG. 6.

In an embodiment, the receiving unit 701 can be controlled by a software, the control unit 703, or a combination thereof. In another specific embodiment, the local oscillator source LO can be a part of the receiving unit 701 or the control unit 703. In another specific embodiment, the local oscillator source LO can be separate from the receiving unit 701 and the control unit 703. The control unit 703 can be a hardware and/or a software element. In one specific embodiment, the control unit 703 can be controlled by a software. In another specific embodiment, the control unit 703 can be configured to control and/or drive the components of the receiving unit 701 and the local oscillator source LO.

Figure 8:
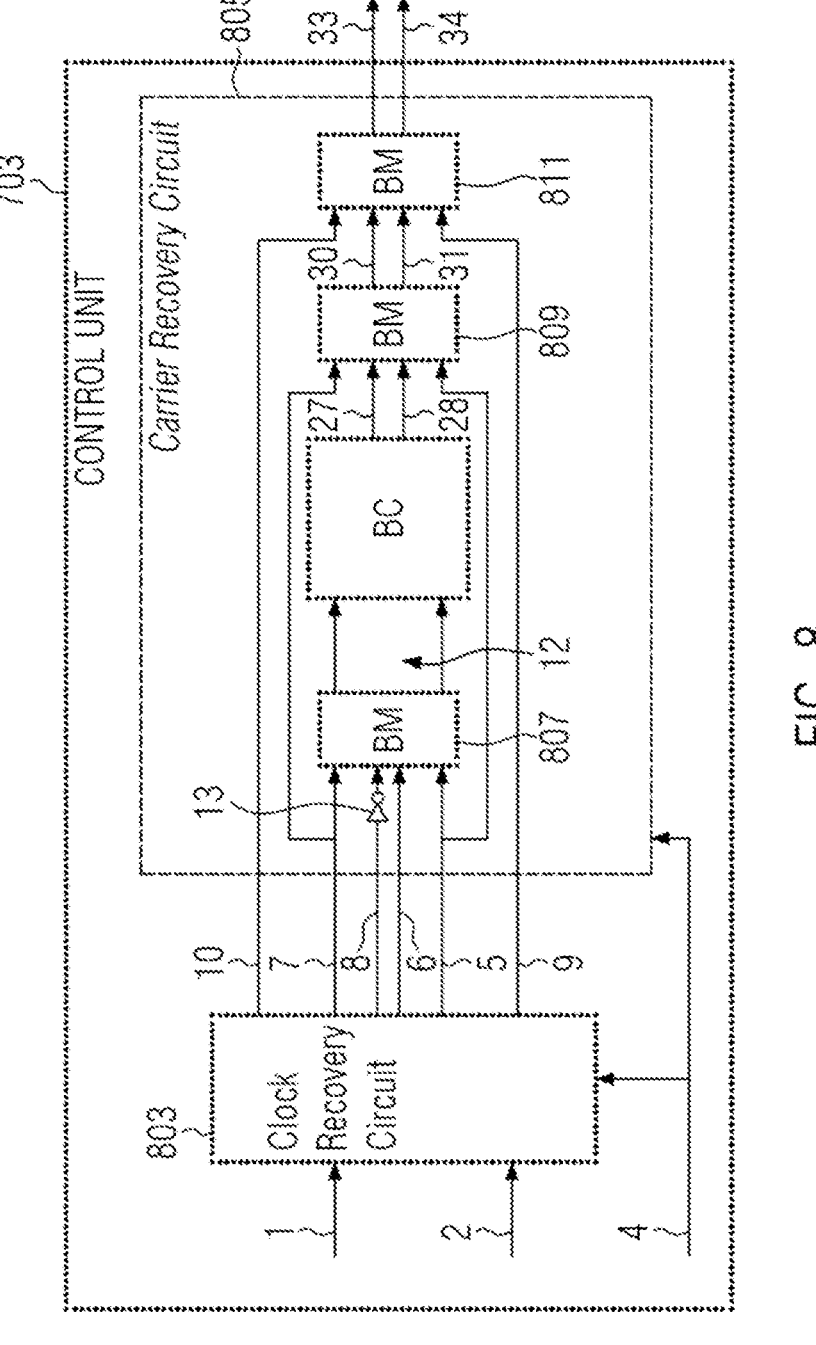
FIG. 8 illustrates a part of the device, in particular, a control unit, in accordance with specific embodiment(s) of the present invention.

A specific non-limiting embodiment of the invention will be explained with reference to FIGS. 8 and 9. FIG. 8 illustrates the control unit 703 of the device 700. In this specific embodiment, the control unit 703 includes a clock recovery circuit 803 configured to receive the signal pulse received and/or detected by the receiving unit 701, and/or the at least one pilot pulse R for recovering carrier information. The control unit 703 further includes a carrier recovery circuit 805 for recovering carrier information. In particular, in a specific embodiment, the clock recovery circuit 803 acts as an input circuit, for the carrier recovery circuit 805, to aide compensating the phase difference. A separate clock recovery circuit and a separate carrier recovery circuit, however, is not necessary as long as the control unit is configured to perform the functionality thereof.

In this specific embodiment, the inventive device 700 and the inventive method 300 can perform the carrier recovery, using the clock recovery circuit 803 and the carrier recovery circuit 805, for compensating the difference between the received data clock or processing speed and the sampling frequency.

The clock recovery circuit 803 of the control unit 703 can be configured to choose or identify at least one out of the plurality of samples $R_0$, $R_1$ of the pilot pulse R based on any one of the time delay $T_d$ between pilot pulse and the signal pulse, the power, the amplitude, the intensity of the pilot pulse R, and the peak values thereof. In this specific embodiment, the sample $R_1$ is chosen to be the optimal sample based on the peak power/amplitude/intensity of the pilot pulse R, in particular in terms of optical power on the pilot pulse R. The sample $R_0$ can be chosen based on the predetermined sampling frequency, and/or based on a predetermined time delay with $R_1$ of the pilot pulse R.

In this embodiment, the carrier recovery circuit 805, using the input from the clock recovery circuit 803 and the at least one pilot pulse R and its samples thereof, is configured to determine the phase difference and recover the carrier information using the phase difference. The compensating factor W can be calculated using the block module 600.

In this specific embodiment, the carrier recovery circuit 805 includes more than one block modules described above, in particular three block modules 807, 809, and 811 (FIG. 8). Using the block module functionality, a description of the inventive carrier recovery to solve Eq. (8) is shown in FIG. 8, where $X_{B_j}$ 1 and $P_{B_j}$ 2, which are Bob's (i.e. receiving unit's) signals, preferably, digitized, are provided as inputs for the clock recovery circuit 803.

As described above, the clock recovery circuit 803 can be configured to choose/identify the best sample in terms of optical power of the pilot pulse i.e. $R_{1,i}$, its adjacent sample $R_{0,i}$, and the quantum signal pulse $S_{k,i}$, using an input process clock 4 with frequency of $1/T_s$. The clock recovery circuit 803, using, for example, a register made of D-flip-flops with control input option, is configured to output and latch signals $X_{R_{1,j}}$ 5, $X_{R_{0,j}}$ 6, $P_{R_{1,j}}$ 7, $P_{R_{0,j}}$ 8, $P_{S,i}$ 9, $X_{S,i}$ 10, until the next updated pilot pulse i.e. $(i+1)^{th}$ or the quantum signal pulse i.e. $(k+1)^{th}$. Using the signals 5 to 8 as the input, the block module 807 outputs 12 (referred as $Out_1$ and $Out_2$) by applying Eq. (7) as follows:

$$Out_1 = \sin(\Delta \varphi_{R_i})$$

$$Out_2 = \cos(\Delta \varphi_{R_i}) \tag{11}$$

A logical NOT operator 13, can be used, for example, before $P_{R_{0,j}}$ 8 to correct any sign mismatch between the block module 807 functionality and Eq. (7). The position of the logical NOT operator, however, is not limited thereto.

As illustrated in FIG. 8, the outputs 12 of the block module 807 can act as inputs for a Block Circuit BC. Thus, the Block Circuit BC can be configured to receive two inputs, namely $\sin(\Delta\varphi_{R_i})$ and $\cos(\Delta\varphi_{R_i})$ which are output from the block module 807.

Figure 9:
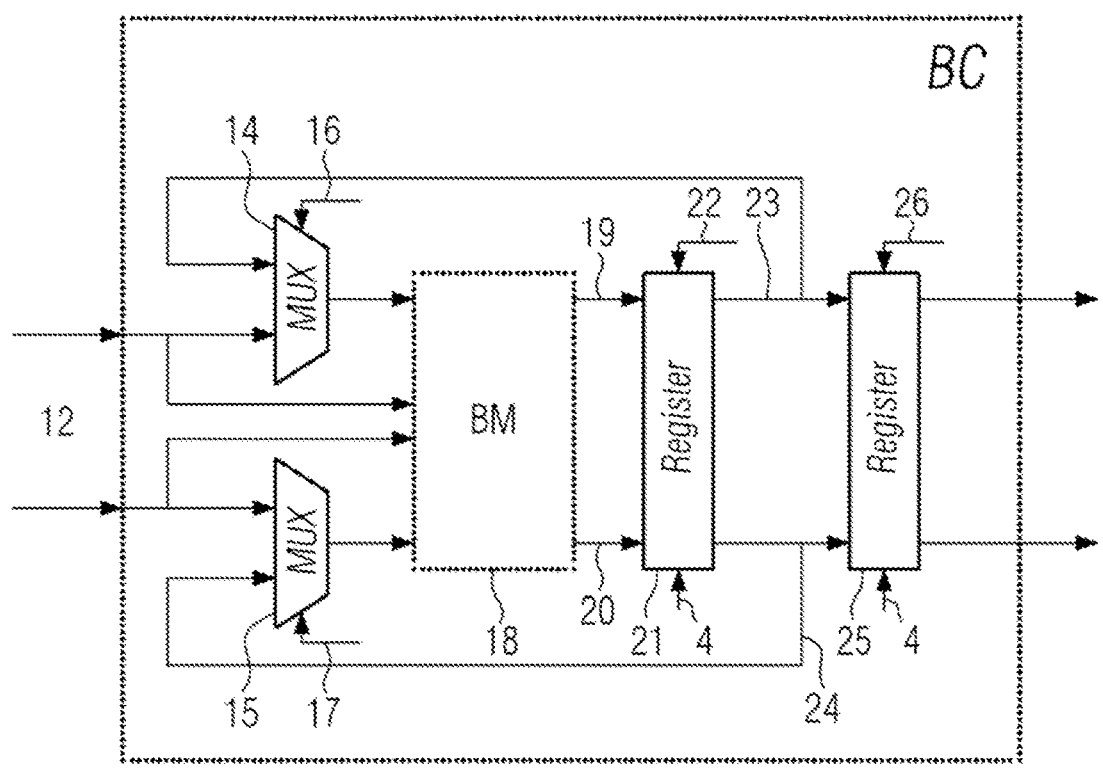
FIG. 9 illustrates a part of the control unit, in particular, a Block Circuit (BC) in accordance with specific embodiment(s) of the present invention.

The Block Circuit BC of FIG. 8 is illustrated in detail in FIG. 9. The Block Circuit BC is also a block module 18 but can additionally include one or more multiplexers 14, 15 configured to select one or more input for the block module, and one or more register buffers 21, 25 configured to process one or more input for the block module.

The multiplexers 14, 15, using optional control signals 16, 17, can pass the inputs of the Block Circuit BC (that is, outputs of the block module 807) to the block module 18 to obtain $\sin(2\cdot\Delta\varphi_{R_i})$ and $\cos(2\cdot\Delta\varphi_{R_i})$ as the outputs 19, 20, respectively. The register buffer 21, using optional control signal 22, can latch its input data in the event of the input process clock 4. The control signals 16, 17 can be controlled or changed so that the multiplexers 14, 15 can pass the obtained outputs, fed-back to the block module 18 to combine with $\sin(\Delta\varphi_{R_i})$ and $\cos(\Delta\varphi_{R_i})$, to obtain $\sin(3\cdot\Delta\varphi_{R_i})$ and $\cos(3\cdot\Delta\varphi_{R_i})$. The control signals 16, 17 can maintained preferably at ON state until the next detected pilot pulse (i.e. $(i+1)^{th}$). The block module 18 can obtain $\sin(j\cdot\Delta\varphi_{R_i})$ and $\cos(j\cdot\Delta\varphi_{R_i})$ 23, 24, respectively, corresponding to $j^{th}$ sample after $R_{0,i}$. In an embodiment, after N quantum signal pulses, controls 16, 17, and 22 can be reset for the next pattern, with the same functionality as before. For example, if the $(j+1)^{th}$ sample after $R_{0,i}$ is a quantum pulse, the second register buffer 25 of the Block Circuit BC and its optional control 26, can latch $\sin(j\cdot\Delta\varphi_{R_i})$ and $\cos(j\cdot\Delta\varphi_{R_i})$, for $Output_1$ 27 and $Output_2$ 28 resulting:

$$Output_1 = \sin(\Delta\varphi_{R_i})$$

$$Output_2 = \cos(\Delta\varphi_{R_i}) \tag{12}$$

Using Eq. (5) and Eq. (6), and by using the signals from the Block Circuit BC outputs, to obtain the elements for rotation matrix $W_i$ in Eq. (9), the following outputs can be achieved by the block modules 809 as $Out'_1$ 30 and $Out'_2$ 31:

$$Out'_1 = P_{R_{1,i}}\cdot\cos(\beta\cdot\Delta\varphi_{R_i}) + X_{R_{1,i}}\cdot\sin(\beta\cdot\Delta\varphi_{R_i}) = \sin(\varphi_{R_{1,i}} + \beta\cdot\Delta\varphi_{R_i})$$

$$Out'_2 = X_{R_{1,i}}\cdot\cos(\beta\cdot\Delta\varphi_{R_i}) - P_{R_{1,i}}\cdot\sin(\beta\cdot\Delta\varphi_{R_i}) = \cos(\varphi_{R_{1,i}} + \beta\cdot\Delta\varphi_{R_i}) \tag{13}$$

where combination of Eq. (13) with in-phase and quadrature of $S_{k,i}$ as the inputs into the block module 811, can solve the Eq. (8) with equivalent values on $X'_{S_{k,i}}$ 33 and $P'_{S_{k,i}}$ 34 by:

$$X'_{S_{k,i}} = X_{S,i}\cdot Out'_2 + P_{S,i}\cdot Out'_1$$

$$P'_{S_{k,i}} = X_{S,i}\cdot Out'_1 + P_{S,i}\cdot Out'_2 \tag{14}$$

Therefore in Eq. (14), the signal pulses can be considered rotated based on estimated value(s) in Eq. (13), and the matrix elements of $S_i'$ can be recovered corresponding to the phase fluctuations. In an embodiment, by receiving the next pilot pulse, the entire carrier recovery procedure can be restarted.

Figure 10:
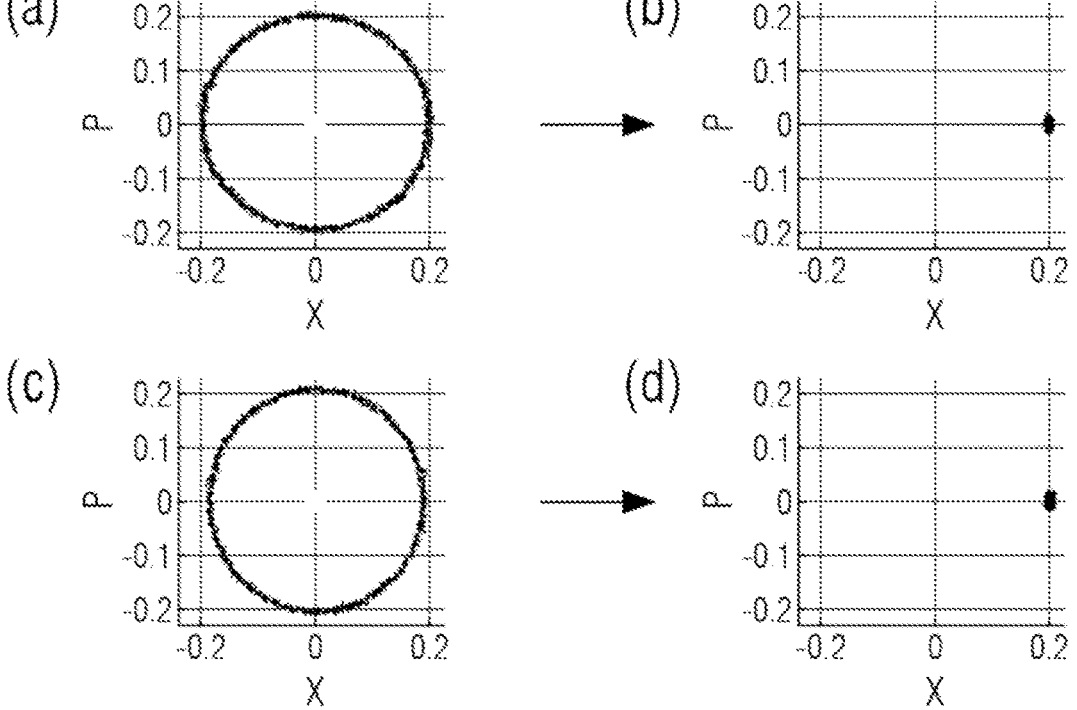
FIG. 10 illustrates simulation results supporting the method and evaluating the performance of the inventive carrier recovery.

FIG. 10, illustrates a simulation result support the method and evaluating the performance of the inventive carrier recovery method. In FIGS. 10(*a*) and 10(*c*), the constellation of quantum pulses including in-phase of X and quadrature P with $(\Delta f + f_n) = 60$ MHz (a) and 1060 MHz (c) with M=16, N=1, $T_s = 1$ ns, and total pilot and quantum pulse width of $2T_s$ is simulated. It can be seen that for $(\Delta f + f_n) > 1/T_s$, constellations can rotate more than $2T_s$ during a sample period of $T_s$. FIGS. 10(*b*) and 10(*d*) show the recovered quantum pulses corresponding to signals in FIGS. 10(*a*) and 10(*c*), respectively. The simulation result indicates that using the inventive method, data can be recovered correctly and accurately even for very large frequency drifts. In this embodiment, there is no theoretical limit for choosing M and N. However, since in practical applications the laser frequencies may change even in the short period of time, it is preferably to limit M and N to a range of 2 to 256 and 1 to 256, respectively, to have an optimal and better performance for carrier data recovery. In a most preferred embodiment, M=16, and N=1.

As described with respect to FIG. 9, in the invention, along with feed-forward phase compensation, a feed-back signal obtained from the estimated value(s), for example, of Eq. (13), can also be used to minimize the frequency difference of the lasers by actively tuning the wavelength of the local oscillator LO source. Preferably, using a total number of 16 multipliers and 8 adders, a simple but robust feed-forward carrier recovery can be achieved.

The configuration described with reference to FIGS. 6 to 9 can also be applied by offline processor(s) or real-time digital signal processing units such as a field-programmable gate array (FPGA), with low-cost lasers for cost effective systems in both classical communications and quantum cryptography applications. In particular, according to an embodiment of the invention, the control unit 703 can be implemented in a digital signal processing hardware/software. In one specific example, the digital signal processing hardware may be the field-programmable gate array (FPGA). Thus, the present invention can be combined with digital signal processing (DSP) to recover transmitted information.

The present invention provides an improved method and/or device that can accurately recover quantum signal pulse(s) in the presence of large frequency drifts (of light sources) while also reducing the hardware complexity. In particular, the disclosed method and/or device can allow compensating large frequency drifts associated to signal instability of light source(s) (e.g. laser), and can also offer the possibility of simplified hardware/software implementation with real-time operation because of efficient and improved carrier recovery procedure. In other words, by using multiple samples of the pilot pulse, the present invention can allow accurate carrier recovery in a large range of frequency drifts between the light sources of the transmitter and receiver when compared to conventional techniques which use one sample of the pilot pulse. The inventive method and/o device can be particularly suitable for quantum cryptography, for example CV-QKD which is based on coherent detection of low-intensity quantum pulses.

The present invention also discloses the carrier recovery using hardware relying on simple mathematical operations, including multiplication and addition (or subtraction), which can thus facilitate real time implementation using digital signal processing units and allows avoiding computer-demanding trigonometric functions or LUT.

Furthermore, the inventive method and/or device can allow phase and/or frequency recovery in coherent optical communication and can be configured with offline processors and/or real-time DSP such as FPGA, with low-cost lasers for cost effective systems, for example, in both classical communications and quantum cryptography applications.

One or more of the above-mentioned embodiments/steps/examples of the present invention can be automated completely or partially using one or more of components such as a processing/computing device and a software/program. One or more steps/embodiments/examples of the present invention can be implemented by use of these components.

It will be appreciated that the above description has described and illustrated specific embodiments and examples. However, the description is intended to cover any and all variations of various embodiments and examples of the invention. Combinations of the above embodiments/examples/arrangements not specifically described herein, will be apparent to those of skill in the art upon reviewing the above description. Therefore, it is intended that the disclosure not be limited to the particular embodiments/examples/arrangements disclosed, but that the invention will include all embodiments and arrangements falling within the scope of the appended claims.

The invention claimed is:

1. A method for feed-forward carrier recovery comprising the steps of:
   receiving an optical signal from a light source, the optical signal comprising at least one pilot pulse and at least one signal pulse including information;
   determining quadrature values of a plurality of samples of the at least one pilot pulse using a local oscillator signal of a local oscillator source;
   determining a phase difference between the received optical signal from the light source and the local oscillator signal of the local oscillator source using the quadrature values of the plurality of samples; and
   recovering the carrier information of the at least one signal pulse based on the determined phase difference.

2. The method of claim 1, wherein quadrature values of at least two adjacent samples of the at least one pilot pulse are used for determining the phase difference.

3. The method of claim 1, wherein the at least one of the samples of the pilot pulse is chosen based on any one of a predetermined time delay between the pilot pulse and the at least one signal pulse, the power, the amplitude, the intensity of the pilot pulse, and the peak values thereof.

4. The method of claim 1, wherein the step of recovering the carrier information includes a step of calculating a compensating factor to determine quadrature values of the at least one signal pulse.

5. The method of claim 4, wherein the compensating factor is calculated based on any one of the phase difference, time delay between two adjacent samples of the pilot pulse, time delay between the at least one signal pulse and one of the samples of the pilot pulse, and or any combinations thereof.

6. The method of claim 4, wherein the compensating factor includes one or more trigonometric coefficients.

7. The method of claim 4, wherein the compensating factor is calculated using a block module.

8. The method of claim 1, wherein the optical signal includes a train of signal pulses.

9. The method of claim 1, wherein one or more of the samples of the pilot pulse are sampled at a sampling frequency $(1/T_s)$ that is at least twice the inverse of a pulse width of the pilot pulse.

10. The method of claim 1, wherein the at least one pilot pulse is an optical pulse with intensity higher than that of the at least one signal pulse.

11. The method of claim 1, wherein the at least one pilot pulse is interleaved with the at least one signal pulse.

12. The method of claim 1, wherein the at least one signal pulse is transmitted according to a quantum cryptography protocol.

13. A device configured for feed-forward carrier recovery comprising:
   a receiving unit configured to receive an optical signal from a light source, the optical signal comprising at least one pilot pulse and at least one signal pulse including information; and
   a control unit configured to determine quadrature values of a plurality of samples of the at least one pilot pulse using a local oscillator signal of a local oscillator source; wherein the control unit is further configured to:
      determine a phase difference between the received optical signal of the light source and the local oscillator signal of the local oscillator source using the quadrature values of the plurality of samples; and
      recover the carrier information of the at least one signal pulse based on the determined phase difference.

14. The device of claims 13, wherein the control unit is configured to determine the phase difference using quadrature values of two adjacent samples of the at least one pilot pulse.

15. The device of claim 13, wherein the control unit is configured to calculate a compensating factor to determine quadrature values of the at least one signal pulse.

16. The device of claim 13, wherein the control unit comprises a clock recovery circuit configured to receive the signal pulse received and/or detected by the receiving unit, and/or the at least one pilot pulse for recovering carrier information.

17. The device of claim 16, wherein the clock recovery circuit is configured to choose at least one of the samples of the pilot pulse based on any one of a predetermined time delay between the pilot pulse and the at least one signal pulse, the power, the amplitude, the intensity of the pilot pulse, and the peak values thereof.

18. The device of claim 15, wherein the control unit is configured to calculate the compensating factor based on any one of the phase difference, time delay between two adjacent samples of the pilot pulse, time delay between the at least one signal pulse and one of the samples of the pilot pulse, and or any combinations thereof.

19. The device of claim 15, wherein the compensating factor includes one or more trigonometric coefficients.

20. The device of claim 13, wherein the control unit comprises a block module configured to calculate the compensating factor.

21. The device of claim 20, wherein the block module comprises at least one adder and at least one multiplier for calculating the compensating factor.

22. The device of claim 20, wherein the block module comprises at least one multiplexer configured to select one or more input for the block module, and at least one register buffer configured to process one or more input for the block module.

23. The device of claim 13, wherein the control unit is implemented in a digital signal processing (DSP) hardware.

* * * * *